United States Patent [19]

Bell et al.

[11] Patent Number: 4,749,256
[45] Date of Patent: Jun. 7, 1988

[54] MOUNTING APPARATUS FOR HEAD-UP DISPLAY

[75] Inventors: Ronald Bell, Snellville; Vinson A. Loos, Woodstock; Robin D. Huckaby, Snellville; James E. Farrer, Chamblee, all of Ga.

[73] Assignee: GEC Avionics, Inc., Norcross, Ga.

[21] Appl. No.: 14,669

[22] Filed: Feb. 13, 1987

[51] Int. Cl.⁴ ............................................. G02B 27/10
[52] U.S. Cl. .................................................... 350/174
[58] Field of Search .......................................... 350/174

[56] References Cited

U.S. PATENT DOCUMENTS 4,188,090 2/1980 Ellis .................................... 350/174

Primary Examiner—John K. Corbin
Assistant Examiner—Jay P. Ryan
Attorney, Agent, or Firm—Jones, Askew & Lunsford

[57] ABSTRACT

A mounting apparatus for mounting the pilot's display unit for a head-up display system in an aircraft cockpit affords a stowage position for the display unit which does not restrict the pilot's movement or obscure his vision, and further provides ease of transition between the operating and stowage positions. The mounting apparatus provides a crash-release feature which permits the pilot's display unit to breakaway forwardly upon impact and to be constrained in a forward position to prevent the display unit from rebounding violently rearwardly toward the pilot's head. The mounting apparatus further provides a quick-replacement capability which permits fast and easy removal and installation of the pilot's display unit with a minimum of tools and no need for realignment.

14 Claims, 5 Drawing Sheets

MOUNTING APPARATUS FOR HEAD-UP DISPLAY

TECHNICAL FIELD

The present invention relates generally to head-up display systems used in aircraft, and relates more particularly to an apparatus for mounting the pilot's display unit of a head-up display system.

BACKGROUND OF THE INVENTION

Head-up displays ("HUDs") for use in aircraft are well known. Generally speaking, an aircraft head-up display is an optical display apparatus for projecting symbology of vital flight parameters into the pilot's field of view while he is sitting in the normal "head-up" position looking out a forward portion of the windscreen in a conventional manner. A head-up display integrates outside visual cues with internally generated images conveying aircraft preformance data to assist the pilot in a variety of conditions. Such a system can provide useful and important information about the operating condition of the aircraft without requiring the pilot to divert his attention from outside the aircraft, refocus on an instrument panel, and then redirect his attention to the outside world.

A wide variety of flight parameter symbology can be provided, depending upon the requirements of the particular installation. In commercial aircraft, the head-up display can provide information pertaining to the aircraft's heading, altitude, airspeed, attitude, and landing environment. In military aircraft, the head-up display can advantageously be used for targeting purposes. An indicia of the aiming point of the aircraft's weaponry, such as a cross-hair, is provided on the head-up display. When the image of the cross-hair is superimposed on the desired target, the pilot knows it is appropriate to actuate the weapon. If the sights are properly calibrated, the round should strike the target.

A typical head-up display may consist of several components, for example, a control panel, a symbol generator, a video drive unit, and a pilot's display unit. The symbol generator is a small digital computer which uses its own programmed logic to convert inputs from the aircraft sensors into the CRT drive instructions. These instructions are provided to the video drive unit which converts the input signals into the CRT drive voltages. These drive voltages generate the symbols projected to the pilot by the pilot's display unit.

The pilot's display unit ("PDU") comprises a housing to which are mounted a CRT and an optical module containing a combiner glass and collimating lens. The optical module reflects an image generated by the CRT to the eye of the pilot, while also allowing light from outside the aircraft to pass through the optical module to the pilot's eye. Thus, the head-up display combines images from the outside world showing what is actually in front of the aircraft, together with the images created by the CRT. Since the pilot's display unit must be interposed into the pilot's normal line of vision, the positioning of the PDU within the cockpit is critical.

In helicopters, as opposed to fixed wing fighter or bomber aircraft, monocular head-up displays have become popular. As the name implies, a monocular HUD is one in which the CRT projects the flight parameter symbology into only one eye of the pilot. The other eye is available for normal observation outside the aircraft.

The pilot's display unit of a monocular head-up display normally attaches to a fixed overhead mounting and is suspended directly in front of the pilot's eye when the head-up display is in use. To provide a large field of view from an optic of minimal size, the display is preferably located only about four inches from the pilot's eye in its operational or "boresight" position. Because of the proximity of the hardware to the pilot's head, when the pilot is performing other operations within the aircraft that do not require the use of the head-up display, it is important that the display be easily removable from its operative position directly in front of the pilot's face such that it does not restrict his movement or obscure his vision.

Thus, there is a need to provide a mounting apparatus for the pilot's display unit of a head-up display system which permits easy removal of the PDU from its operational position, in which it is interposed in the pilot's line of sight, to a stowage position in which it is out of the way.

A further practical restraint for monocular head-up displays is to make sure the pilot's display unit can be quickly and easily swung from its stowage position to its operational position by the pilot without unduly impairing his operation of the aircraft. With particular reference to military aircraft, it will be appreciated that flying under combat conditions is an extremely stressful undertaking. When a target is spotted, necessitating that the display unit be lowered to its operational position, the pilot must be able to do so very quickly and in a manner which does not interfere with the safe operation of the aircraft.

Those familiar with helicopters will appreciate that they are equipped with two hand controls for operating the aircraft. The pilot's right hand operates the cyclic control, which controls the critical parameters of pitch and roll of the helicopter. On the left is the collective lever, controlling the pitch of the rotor blades. While the pilot can safely momentarily release his grip of the collective lever without endangering the aircraft, it is strongly preferred to maintain the pilot's right hand on the cyclic control at all times, and especially at low altitudes.

Accordingly, there is a further need to provide a mounting apparatus for the pilot's display unit of a head-up display which permits quick and easy movement of the PDU between its stowage and operational positions using only the pilot's left hand, while the pilot's right hand remains on the controls.

A further important aspect of the mounting apparatus for the pilot's display unit of a monocular head-up display in an aircraft concerns the necessity for protecting the pilot's safety in the event of sudden deceleration of the aircraft. This condition would be encountered, for example, in the event of a aircraft crash. If an aircraft is engaged in a survivable crash, the sudden, almost instantaneous, deceleration of the aircraft would cause the pilot's head to be thrown violently forward. With the pilot's display unit interposed in the pilot's line of vision only four inches from the pilot's face, provision must be made to permit the PDU to break away from its boresight position upon impact by the pilot's helmet.

Further complicating this problem is the fact that when the pilot's display unit, having thus been broken away from its operational position, suddenly encounters the forwardmost extremity of its range of movement, it will tend to rebound violently rearwardly. In view of the forces encountered in typical crash environments, a display unit thus hurtling rearwardly towards the pilot's head and impacting with the pilot's facial or jawbones can cause serious, or even fatal, injury.

Efforts have been made to provide a mounting apparatus which permits the pilot's display unit to be removed to a stowage position out of the pilot's line of vision, and which affords protection to the pilot in the event of a crash. One such apparatus is disclosed in U.S. Pat. No. 4,188,090 to Ellis. Ellis discloses a mounting apparatus for the pilot's display unit of a monocular head-up display whereby the PDU is pivotable about an axis of rotation. In a first embodiment, the axis of rotation is overhead and transverse to the longitudinal axis of the aircraft. In an alternative embodiment, the single axis of rotation is inclined with respect to the aircraft's orthagonal axes at such an angle that the pivoting movement of the PDU has a major component to the left or right of the pilot's line of sight. The display unit is maintained in its operational position by a compliant member which yields if the PDU is impacted by a sudden accidental forward movement of the pilot's helmet, permitting the PDU to break away during a crash. This design further contemplates that the pilot's display unit can be moved to a stowage position, either by pivoting the PDU forwardly until it swings out of the pilot's line of sight, or by pivoting the PDU rearwardly to stow it flush against the overhead.

The design disclosed in Ellis suffers a number of disadvantages. First, such a design cannot be adapted to provide a suitable stowage position for the PDU in a large number of aircraft. Initial forward rotation of the display unit moves the lower edge of the unit along an arcuate path having a major horizontal component and only a minor vertical component. Thus, the PDU must be rotated a substantial distance forward in order to impart any appreciable vertical movement to the lower end of the display unit. In other words, in order to utilize a forward stowage position, the pilot's display unit must be swung a considerable distance forward before the lower end of the display unit is raised out of the pilot's line of vision. However, since the windscreens for most helicopters are positioned as close to the pilot as possible in order to afford maximum visibility in all directions, there often is insufficient space forward of the pilot to permit the display unit to be rotated forward far enough to be raised completely out of the pilot's line of sight. Such is particularly the case with the widely-used Sikorsky S70 helicopter, making the mounting arrangement disclosed in Ellis inappropriate for retrofit installation into this popular helicopter.

The mounting arrangement disclosed in Ellis is also impractical for moving the pilot's display unit between its operational attitude and a rearward stowage position. In order to store the PDU rearwardly against the overhead, since the display unit in its operational position is only four inches from the pilot's eye, and since the first major component of motion as the PDU is swung rearwardly is towards the pilot's face, stowing the PDU rearwardly requires that the pilot duck to the side as the PDU is being raised and lowered between its stowage and operational positions. Such maneuvers are not only inconvenient but also impede the pilot's ability to control his aircraft.

A further disadvantage to the apparatus disclosed in Ellis is that, while the display unit will break away upon impact to swing forwardly away from the pilot, no provision is made to prevent the unit from rebounding rearwardly as it encounters the forward limit of its range of movement. As previously mentioned, even if the pilot is not seriously injured by his initial impact with the display unit, he can still sustain severe injury by the PDU rebounding violently toward the rear of the aircraft.

Thus, there is a need to provide a mounting apparatus for a pilot's display unit which breaks away from its operational position upon impact by a pilot's helmet, and which is restrained from rebounding rearwardly to prevent further injury to the pilot.

A further problem associated with the prior art head-up display concerns the difficulty associated with replacing the pilot's display unit in the event of a failure. As is well-known, the CRT mounted within the housing of the pilot's display unit has one of the highest failure rates of any component in the head-up display system. In order to replace a typical pilot's display unit of the design disclosed in Ellis, screws securing a cover plate must first be removed to provide access to the mounting bolts. The mounting bolts must then be removed to release the pilot's display unit from its mount. To install the replacement PDU, the steps must be performed in a reverse sequence. It will be appreciated that this procedure requires a variety of tools and, especially in light of the cramped quarters inside an aircraft cockpit, can take as long as a half hour to accomplish. It will be further appreciated that the numerous components and fasteners needed for mounting the prior-art pilot's display unit require precise machining and increased tolerance requirements in the construction of the mounting apparatus, thereby resulting in higher construction costs. Accordingly, there is a need to provide a quick-replacement mounting apparatus for the pilot's display unit of a head-up display system, wherein the display unit can be quickly and easily replaced with a minimum of tools.

There is a further need to provide a pilot's display unit mounting apparatus which reduces the tolerances required during manufacture, thereby providing less expensive construction.

SUMMARY OF THE INVENTION

As will be seen, the present invention overcomes these and other disadvantages associated with prior art apparatus for mounting the pilot's display unit of a head-up display system. Broadly stated, the present invention comprises a mounting apparatus particularly suited for retrofit mounting into existing helicopters and which maintains precise alignment of the pilot's display unit in its operating position for accurate weapon-aiming capabilities. The mounting apparatus affords a stowage position for the display unit which does not restrict the pilot's movement or obscure his vision and which provides ease of transition between the operating and stowage positions. The mounting apparatus of the present invention provides a crash-release feature which permits the pilot's display unit to break away forwardly upon impact and to be constrained in a forward position to prevent the display unit from rebounding violently rearwardly toward the pilot's head. Further, the mounting apparatus of the present invention provides a quick-replacement capability which permits fast and easy removal and installation of the pilot's display unit with a minimum of tools.

Stated somewhat more specifically, the mounting apparatus of the present invention pivotably mounts the pilot's display unit for movement about two different axes of rotation. One axis of rotation provides pivotable movement between the display unit's operational position, wherein it is vertically suspended in front of the pilot's face, and its substantially horizontal stowage position. The other axis of rotation is substantially transverse to the longitudinal axis of the airframe and effects rotation of the pilot's display unit forwardly away from its operational position upon impact, such as by the pilot's helmet in the event of a sudden deceleration of the aircraft. Once the display unit has thus pivotably broken away from its operational position, a latch engages the display unit and secures it in a forward position away from the pilot's head, preventing the display unit from rebounding rearwardly and inflicting injury to the pilot. The pilot's display unit is supported on the mount by a single shaft, with a spring-biased plunger engaging a recess in the shaft to maintain the shaft within the mount. Replacement of the display unit is as simple as disengaging the plunger from the shaft, sliding the display unit off the mount, inserting the shaft of the replacement display unit into the mount, and permitting the spring-biased plunger to engage the recess in the shaft.

Stated more specifically, the mounting apparatus of the present invention includes a strut assembly having adjustable brackets mounted to either end thereof to secure the strut assembly to the overhead of the cockpit. The strut assembly includes a mount housing having a receiver formed therein for receiving a shaft on the back of a yoke. The upper end of the display unit is in turn mounted to the yoke. With the yoke shaft inserted into the receiver in the mount housing, the display unit is rotatably mounted to the strut assembly about an axis of rotation substantially, although not exactly, parallel to the longitudinal axis of the airframe. With the upper end of the display unit thus rotatably mounted, the unit is pivotable between its operational position, in which it is vertically suspended in the pilot's line of sight, and a horizontal stowage position.

A spring loaded plunger is reciprocably mounted within the mount housing adjacent to the receiver such that the end of the plunger bears laterally against the yoke shaft. The yoke shaft has a pair of flatted surfaces formed thereon, these flatted surfaces being engageable by the plunger. The flatted surfaces of the yoke shaft are substantially orthogonal and are oriented such that when the display unit is vertically disposed in its operational position, the plunger engages one flatted surface, thereby maintaining the display unit in the desired position. Rotating the display unit upwardly biases the plunger backwardly against its spring, and as the display unit is rotated into its horizontal or stowage position the plunger engages the second flatted surface to retain the display unit in its stowage position. To protect against the display unit becoming disengaged from its stowage position, such as in response to a jarring of the aircraft, a latch assembly is disposed on the mount housing to engage a pin on the back of the pilot's display unit. When the pilot desires to move the display unit from its stowage position to its operational position, he reaches up with his left hand, disengages the latch, and rotates the display unit downwardly to its vertical operational position. This procedure can be accomplished using only the pilot's left hand, thereby permitting the pilot to maintain his right hand on the controls at all times.

The pilot's display unit is pivotably mounted to the yoke by a pin aligned substantially transverse to the longitudinal axis of the aircraft to affect rotational movement of the display unit in a vertical plane parallel to the longitudinal axis of the aircraft. The display unit is maintained in a normal position with respect to the yoke by means of a compliant latch member which yields in response to a predetermined pressure to permit the display unit to rotate forwardly toward the airscreen. As the display unit rotates forwardly to its crash release position, a latch assembly engages to restrain the display unit in the crash release position, thereby preventing the display unit from rebounding rearwardly and injuring the pilot.

The spring-loaded plunger mounted within the mount housing has a pin formed thereon which extends through a slot in the wall of the mount housing such that the pin rides within the slot as the plunger reciprocates. A fixed post is mounted on the mount housing adjacent to the slideable plunger pin. By inserting a lever, such as the shaft of a screwdriver, between the fixed post and the plunger pin, the plunger can be levered away from the yoke shaft. With the plunger thus disengaged from the recess in the yoke shaft, the yoke shaft can be extracted from the receiver to disengage the pilot's display unit from its mount. A display unit can be remounted just as easily, by levering the plunger away from the receiver, inserting the yoke shaft of the display unit into the receiver, and releasing the plunger to be biased into the recess of the yoke shaft against one of the flatted surfaces. It will be appreciated that this procedure can be accomplished quickly and with the use of only a single tool.

Thus, it is an object of the present invention to provide an improved mounting apparatus for the pilot's display unit of a head-up display system.

It is another object of the present invention to provide an improved pilot's display unit mounting apparatus which is particularly suited for retrofit mounting into existing airframes.

It is a further object of the present invention to provide a pilot's display unit mounting apparatus which may be readily retrofit into an existing airframe having very limited space between the top of the pilot's head and the upper edge of the windscreen where the windscreen joins the airframe.

It is a further object of the present invention to provide a mounting apparatus for a pilot's display unit which permits easy removal of the display unit from its operational position, in which it is interposed in the pilot's line of sight, to a stowage position in which it is out of the way.

It is yet another object of the present invention to provide a mounting apparatus for a pilot's display unit which permits quick and easy movement of the display unit between its stowage and operational positions using only the pilot's left hand, while the pilot's right hand remains on the controls.

It is a further object of the present invention to provide a mounting apparatus for a pilot's display unit which breaks away from its operational position upon impact by a pilot's helmet, and which is restrained from rebounding rearwardly to prevent further injury to the pilot.

It is another object of the present invention to provide a mounting apparatus for a pilot's display unit which permits fast removal and installation of the display unit.

It is a further object of the present invention to provide a mounting apparatus for a pilot's display unit which permits interchangeability of display units without the need for realignment.

Another object of the present invention is to provide a mounting apparatus for a pilot's display unit which permits removal and installation of the display unit using a minimum of tools.

It is a further object of the present invention to provide a mounting apparatus for a pilot's display unit which reduces the tolerances required during manufacture of the mounting apparatus, thereby reducing construction costs.

Other objects, features, and advantages of the present invention will become apparent upon reading the following specifications, when taken in conjunction with the drawings in the appended claims.

DETAILED DESCRIPTION OF THE DISCLOSED EMBODIMENT

Figure 1:
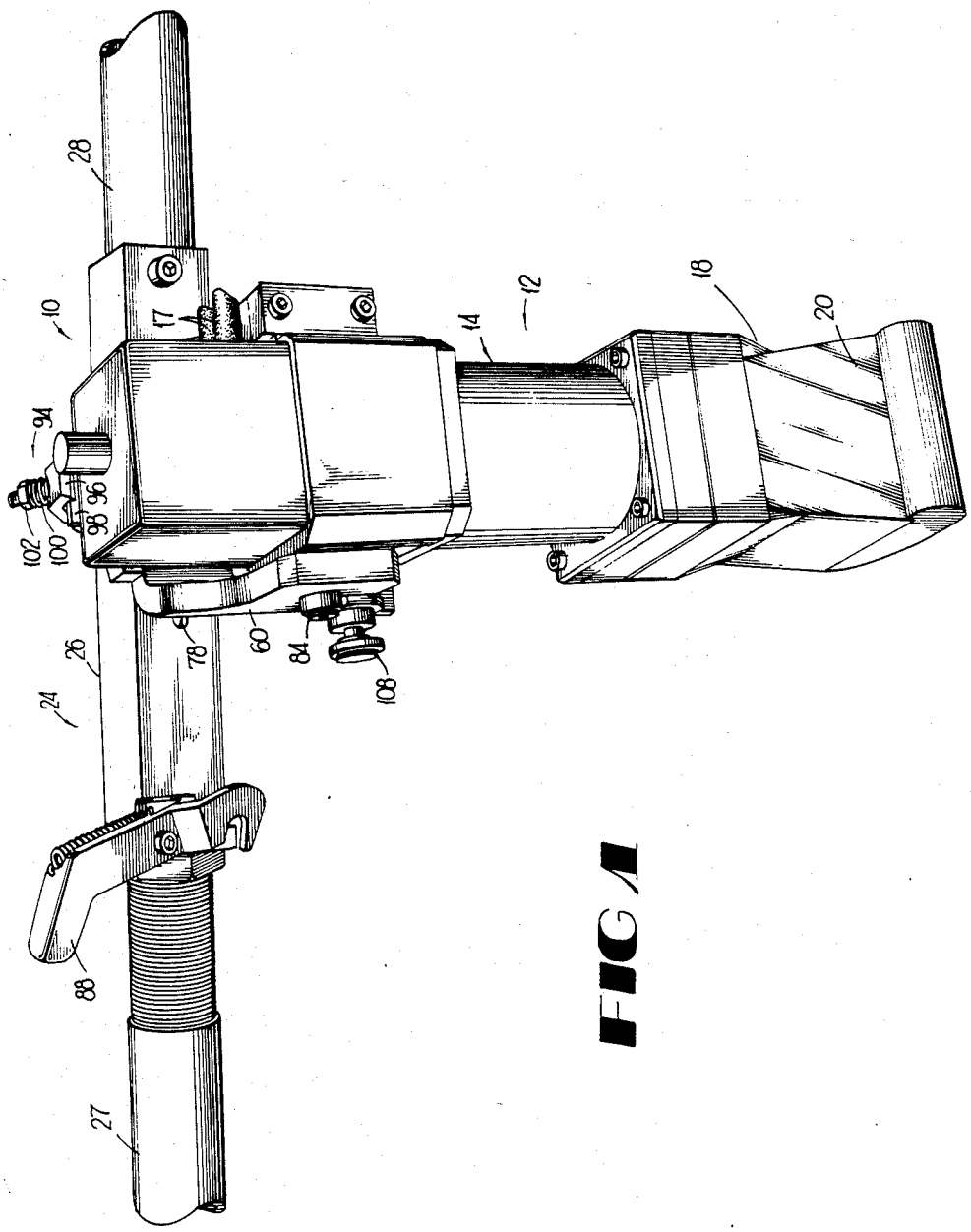
FIG. 1 is a perspective view of an apparatus for mounting the pilot's display unit of a head-up display system according to the present invention.

Referring now in more detail to the drawing, in which like numerals indicate like elements throughout the several views, FIG. 1 shows a mounting apparatus 10 for mounting the pilot's display unit 12 of a head-up display system. It will be understood that the head-up display system further comprises symbol generating electronics, not shown, which components are well-known to those skilled in the art and form no part of the present invention. The pilot's display unit 12 of the preferred embodiment is disclosed with respect to a monocular head-up display, but it will be understood that the mounting apparatus is equally well-suited for any display which is intended to be suspended from the overhead in the pilot's line of vision. Also, while the preferred embodiment is disclosed with respect to a retrofit installation for the popular Sikorsky S-70 helicopter and variations thereof, it will be appreciated that the mounting apparatus is also well-suited for use as original equipment and for use in airframes other than the Sikorsky S-70, both helicopters and fixed-wing aircraft.

The pilot's display unit 12 is a standard monocular display such as is disclosed in the aforementioned U.S. Pat. No. 4,188,090, which patent is incorporated herein by reference. Being of conventional design, the construction and operation of the pilot's display unit 12 will be discussed only generally.

The pilot's display unit 12 includes a housing assembly 14 within which is housed an image source, for example, a cathode-ray tube 16. Conventional electrical cables 17 provide signals to the CRT from the video drive unit, in the manner well-known to those skilled in the art. The pilot's display unit 12 further comprises an optical module 18 bolted onto the bottom of the housing assembly 14. The optical module 18 includes a combiner glass 20 and collimating lens (not shown) which collimate and project images from the CRT into the pilot's line of vision in the conventional manner.

Figure 2:
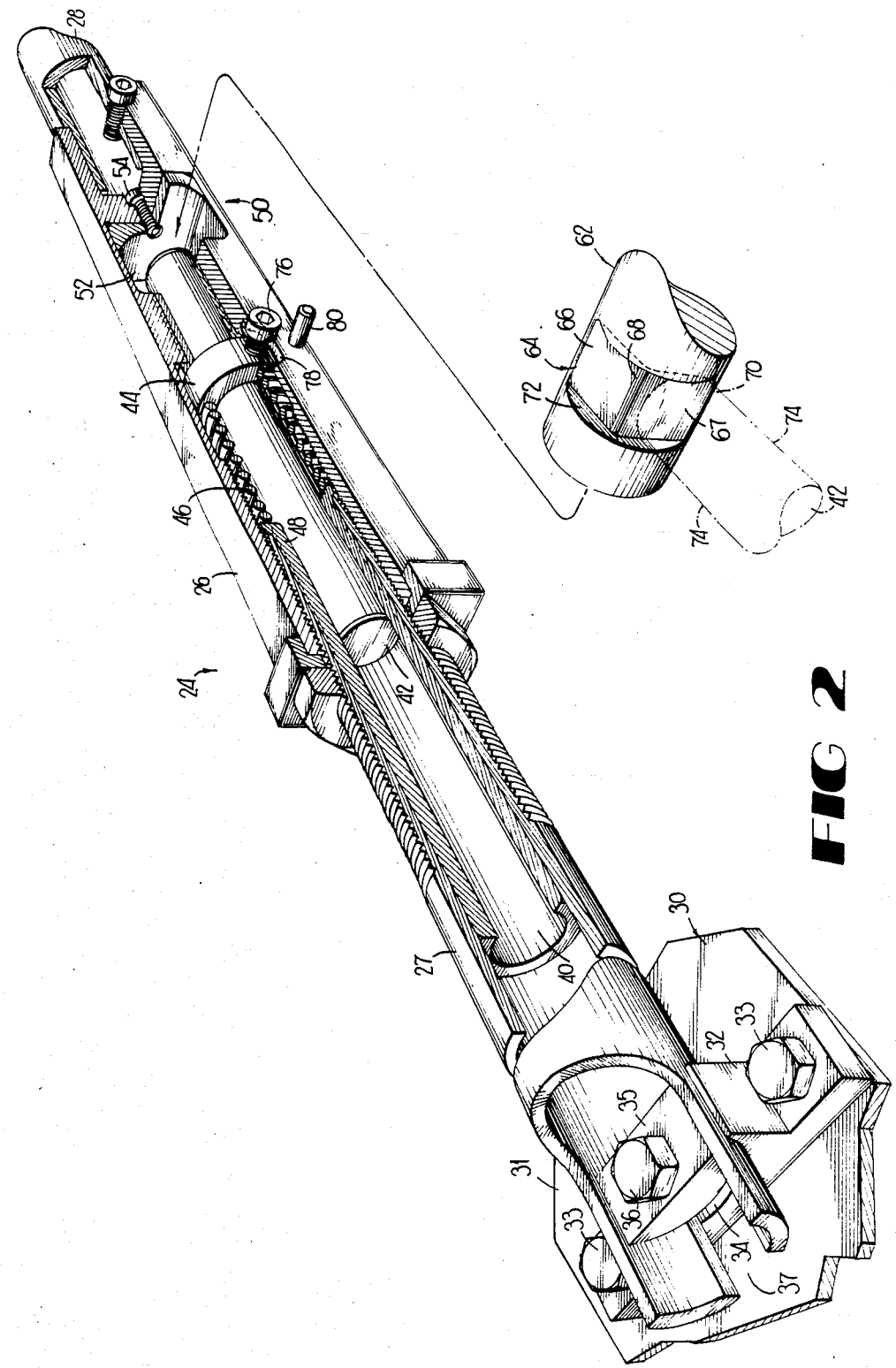
FIG. 2 is partially cut-away perspective view of the display unit interface assembly of the mounting apparatus of FIG. 1.

Referring now to FIG. 2, the mounting apparatus 10 includes a frame or strut assembly 24 comprising a mount housing 26 supported between inboard and outboard tube sections 27, 28. Bracket assemblies 30 provide a means for securing the ends of the strut assembly 24 to the cockpit overhead. Each bracket assembly 30 includes a bracket mounting plate 31 which is bonded or riveted to the aircraft structure, and a cradle 32 which is mounted to the mounting plate. A pair of bolts 33 inserted through elongated holes (not shown) in the cradle 32 engage corresponding threaded bores in the mounting plate 31 to secure the cradle to the mounting plate. It will be appreciated that the elongated bolt holes in the cradle 32 provide play for adjusting the position of the cradle with respect to its mounting plate 31.

The upper surface of each cradle 32 has an arcuate recess 34 formed therein and dimensioned to receive an outer end of the strut assembly 24. A semicircular clamping block 35 fits within the end of the tubes 27, 28 and clamps the end of the strut assembly 24 to its cradle 32. A bolt 36 is inserted through a bore in the clamping block 35, through a slot 37 in the bottom of the tube 27, 28, and into a threaded bore in the cradle 32 to fasten the clamping block in place. The slot 37 is wider than the diameter of the bolt 36, thereby providing some freedom for rotational adjustment of the strut assembly 24 about its longitudinal axis.

While the preferred embodiment is disclosed with respect to an arrangement whereby the bracket assemblies 30 are secured to the sill structure 38 such as would be found above the windscreen 39 of the Sikorsky S-70 helicopter, it will be understood that the bracket assemblies 30 can be secured to any appropriate surface on the cockpit overhead.

With further reference to FIG. 2, the mount housing 26 is hollow and has a cylindrical sleeve 40 disposed therein. One end of a plunger 42 is received within the sleeve 40 for reciprocal movement therein. A portion of the plunger 42 exterior of the sleeve 40 has an annular collar 44 formed thereon. One end of a coil spring 46 coaxially disposed around the plunger 42 bears against the annular collar 44, and the other end of the spring bears against the end 48 of the sleeve 40 to bias the plunger toward the right as seen in FIG. 2.

The mount housing 26 further has a receiver 50 formed therein. A V-block or wear plate 52 forms one wall of the receiver 50 and can be removed from the receiver by loosening the retaining screw 54. In this manner, in the event of excessive wear on the walls of the receiver 50, the wear plate 52 can be replaced without having to replace the entire mount housing 26.

Figure 3:
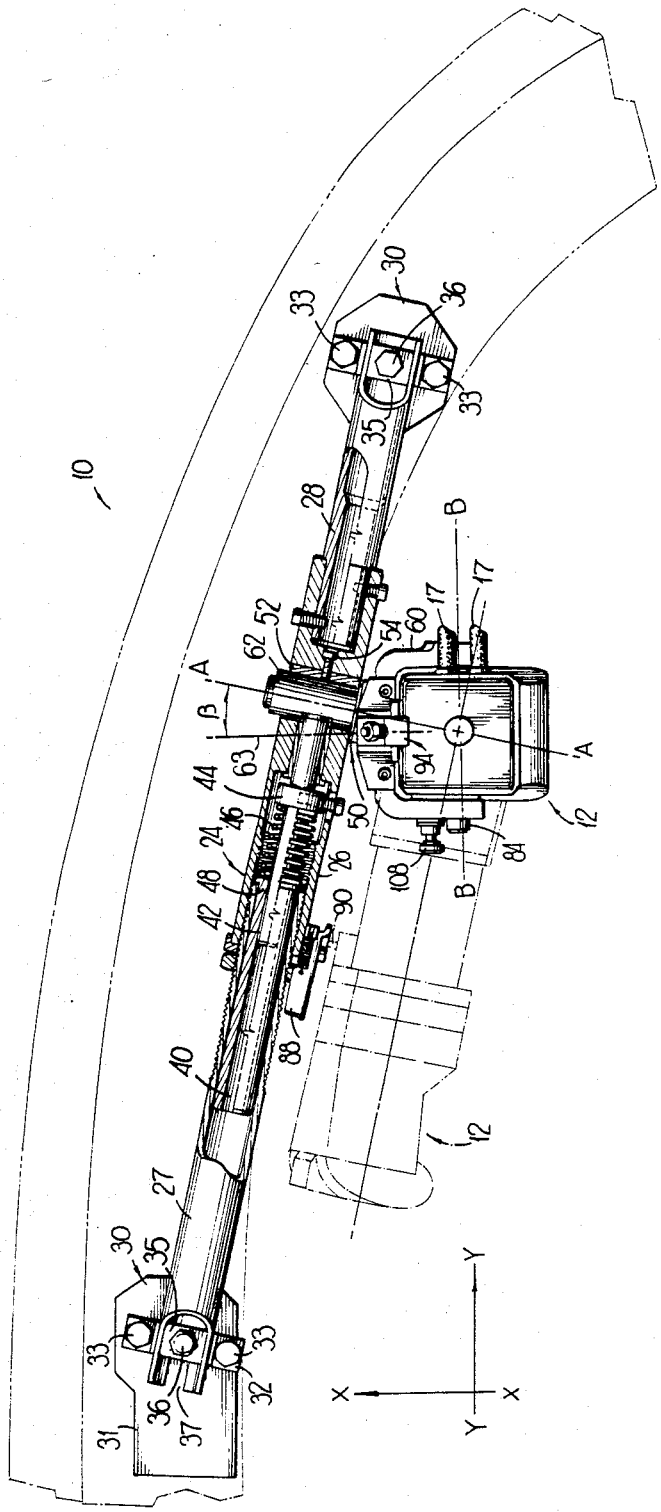
FIG. 3 is a partially cut-away plan view of the mounting apparatus of FIG. 1.

Referring now to FIG. 3, the mounting apparatus 10 further comprises a yoke 60 having a yoke shaft 62 formed thereon. The yoke shaft 62 is inserted into the receiver 50 and rotates therein such that the yoke is thereby pivotably mounted to the strut assembly 24. The yoke 60 is thus pivotably mounted about an axis of rotation, indicated by the line A—A in FIG. 3, coincident with the longitudinal axis of the yoke shaft 62. It will be appreciated that the axis of rotation A—A is substantially, though not exactly, parallel to the longitudinal axis of the aircraft, indicated by the line X—X.

In the disclosed embodiment, it will be noted that the strut assembly 24 is disposed at an angle with respect to the transverse axis Y—Y of the aircraft. Thus, in order to provide proper alignment of the pilot's display unit 12 with respect to the transverse axis of the airframe, the yoke shaft 62 is angularly offset with respect to the yoke 60 by an angle $\beta$ to align the yoke with the transverse axis of the aircraft. Expressed geometrically, the angle $\beta$ between the yoke shaft 62 and the normal axis 63 of the yoke 60 must be the same as the angle between the strut assembly 24 and the transverse axis Y—Y of the aircraft. It will be appreciated that other cockpit configurations may require the strut assembly 24 to be positioned at a different angle with respect to the transverse axis of the aircraft, whereby the angular offset $\beta$ of the yoke shaft must be modified accordingly.

As can perhaps best be seen in FIG. 2, the yoke shaft 62 has a recess 64 formed thereon and defining a pair of flatted surfaces 66, 67. The flatted surfaces 66, 67 intersect at a corner 68. With the yoke shaft 62 inserted into the receiver 50, the plunger 42 is biased by the coil spring 46 to reciprocate against the yoke shaft. The end 70 of the plunger 42 thereby engages the recess 64, with two effects: first, the lateral walls 72 of the recess bear against the lateral edges 74 of the plunger to prevent the yoke shaft 62 from longitudinal movement. Second, when the end 70 of the plunger 42 is brought to bear against one of the flatted surfaces 66, 67, the spring-biased plunger serves to inhibit rotational movement of the yoke 60 on its shaft 62. The significance of these features will be more fully explained below.

The spring-loaded plunger 42 has a pin 76 projecting laterally therefrom. The plunger pin 76 rides in an elongated slot 78 formed in the wall of the mount housing 26. A fixed post 80 projects from the mount housing 26 adjacent the slot 78.

The pilot's display unit 12 is pivotably mounted to the yoke 60 by means of a pivot pin 84. It will be appreciated that the pivot pin 84 provides an axis of rotation, indicated by the line B—B in FIG. 3, which is transverse to the longitudinal axis, or roll axis, of the aircraft. Accordingly, the pilot's display unit is rotatable about the pivot pin 84 in a vertical plane which is parallel to the longitudinal axis of the aircraft.

Figure 4:
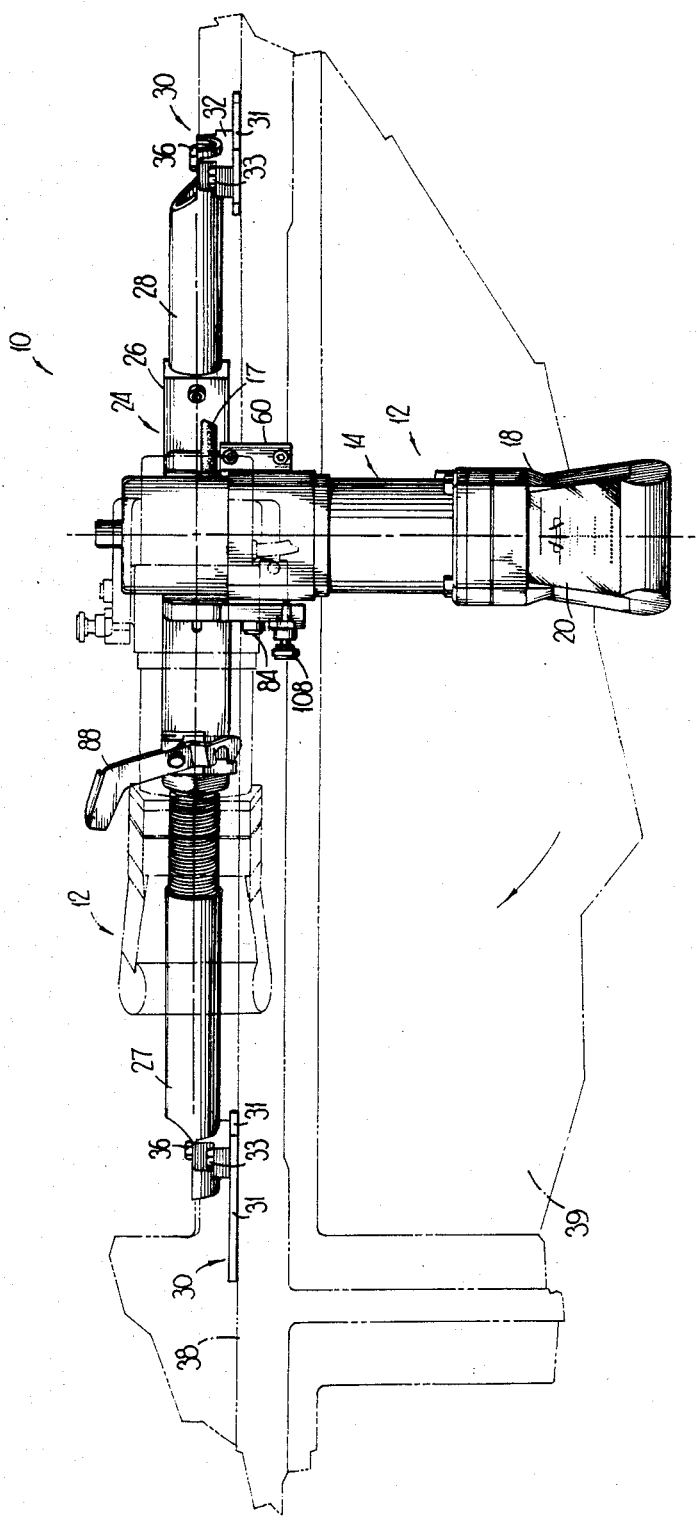
FIG. 4 is a front elevational view of the mounting apparatus of FIG. 1, with solid lines showing the pilot's display unit in its operational position, and with phantom lines showing the display unit in its stowage position.

Referring now to FIG. 4, with the pilot's display unit 12 thus mounted to the yoke 60 and the yoke in turn pivotably mounted to the mount housing 26 in the manner hereinabove described, the display unit can be pivoted from a vertical operational position, shown in solid lines in FIG. 4, to a horizontal stowage position, shown in phantom lines in FIG. 4. The flatted services 66, 67 of the yoke shaft 62 are oriented such that when the PDU is in its operational position, the end of the plunger bears against the first flatted surface 66; and when the PDU is in its horizontal stowage position, the end of the plunger bears against the second flatted surface 67. Thus, the bearing action of the spring-biased plunger serves to maintain the display unit 12 in the selected position.

To further secure the display unit 12 in the horizontal stowage position and to prevent it from becoming dislodged in the event of sudden movements of the aircraft, a spring-biased latch 88 pivotally mounted on the mount housing 26 engages a pin 90 (FIG. 3) formed on the back of the display unit housing assembly 14 when the pilot's display unit is raised to its horizontal stowage position.

Figure 5:
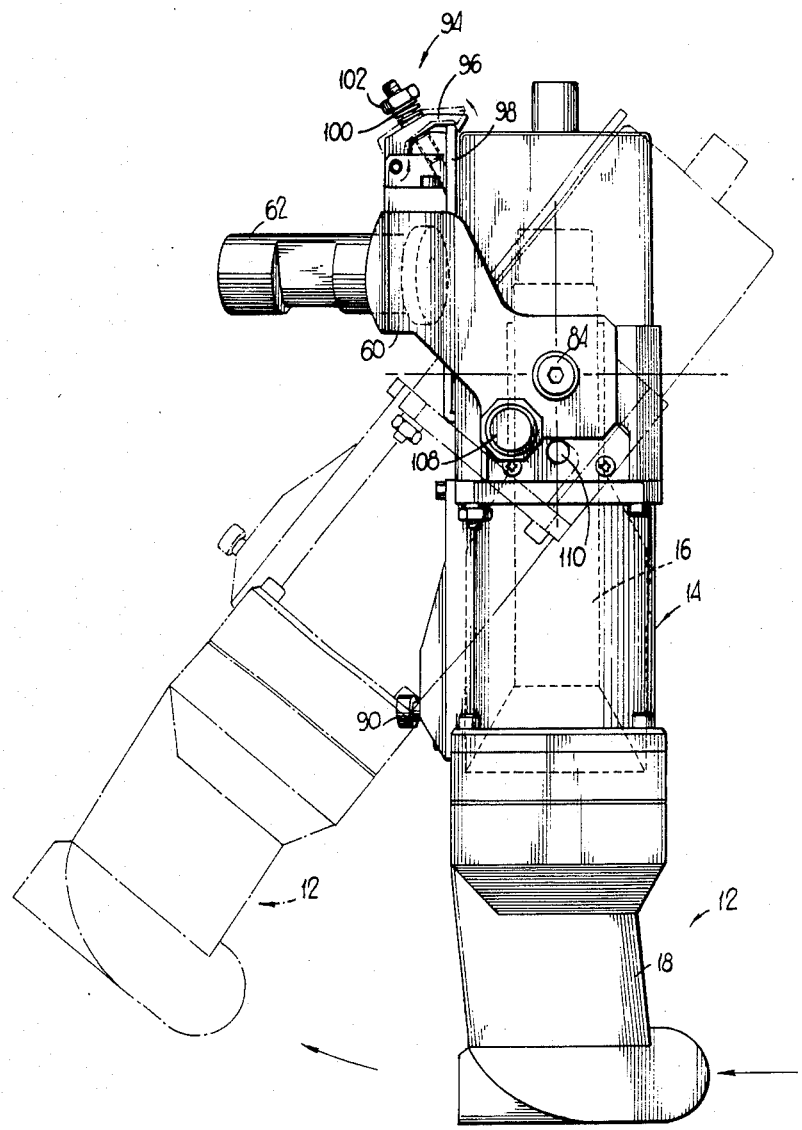
FIG. 5 is a side elevational view of the yoke assembly and pilot's display unit of FIG. 1, with the display unit shown in its operational position in solid lines, and with the display unit shown in its crash-release position in phantom lines.

Referring now to FIG. 5, a crash-release latch assembly 94 is provided at the upper rear edge of the yoke 60. The crash-release latch assembly 94 includes a crash-release latch 96 which normally engages a flange 98 formed at the upper end of the display unit housing assembly 14 to maintain the pilot's display unit in a vertical position with respect to the yoke 60. The latch 96 is biased downwardly into engagement with the flange 98 by means of a spring 100, and the tension of the spring can be adjusted by tightening or loosening an adjusting nut 102. If a rotational force is applied to the pilot's display unit 12 sufficient to overcome the downward force on the latch 96 exerted by the spring 100, the crash-release latch will release the flange 98, permitting free rotation of the display unit about the pivot pin 84. In the disclosed embodiment, a force of from 8 to 20 pounds exerted against the lower end of the pilot's display unit 12 is sufficient to spring the crash-release latch 96 and permit forward rotation of the lower end of the display unit.

A crash-lock pin 108 is mounted in a bore on the side of the yoke 60 and spring-biased inwardly such that the end of the crash-lock pin bears against the display unit housing assembly 14. A recess 110 is formed on the side of the housing 14 such that if the pilot's display unit 12 is rotated forwardly to the crash-release position, shown in phantom in FIG. 5, the crash-lock pin 108 will be biased into engagement with the recess 110 and prevent the pilot's display unit from rebounding rearwardly. The crash-lock pin 108 can be disengaged from the recess by pulling the pin outwardly.

To install the pilot's display unit 12 of a head-up display in the cockpit of an aircraft, the bracket assemblies 30 are first mounted to the sill structure 38. The bracket mounting plates 31 are bonded or riveted to the sill structure, and the cradles 32 are bolted to the mounting plates with the bolts 33. Next, the strut assembly 24 is mounted to the bracket assemblies 30. The ends of the strut assembly 24 are positioned into the arcuate recesses 34 in the cradles 32, and the semicircular clamping blocks 35 are positioned within the tubes 27, 28 to clamp the ends of the strut assembly to the bracket assemblies 30.

An important step in the installation of the mounting apparatus 10 is the alignment of the strut assembly 24 with respect to the airframe. First, horizontal alignment is achieved by inserting shims (not shown) between the bracket mounting plates 31 and the cradles 32, as necessary, to adjust the height of the bracket assemblies 30 and level the strut assembly 24. Next, the azimuthal and elevational orientation of the strut assembly are aligned, using a dummy optics module (not shown) comprising a collimating telescope mounted to a yoke. The dummy optics module yoke has a yoke shaft offset by the same angle as the yoke 60 of the mounting apparatus 10. The yoke shaft of the optics module is installed into the receiver of the mount housing. By sighting through the telescope, the azimuthal and elevational alignment of the strut assembly are calibrated with respect to the longitudinal axis of the airframe. Azimuth adjustment is accomplished by loosening the bolts 33, sliding the cradles 32 forward and backward on their mounting plates 31 as necessary to achieve alignment, and tightening the bolts 33 when the azimuth is properly aligned. Elevational adjustment is accomplished by turning the bolts 36 to loosen the clamping blocks 35, turning the strut assembly 24 about its longitudinal axis as necessary to achieve alignment, and tightening the clamping blocks.

With the strut assembly 24 thus installed, the pilot's display unit 12 can be mounted. With a lever inserted between the fixed post 80 and the plunger pin 76, the plunger 42 is extracted from the receiver 50. The yoke shaft 62 can then be inserted into the receiver 50, and the plunger 42 released to bias against the yoke shaft 62. The end 70 of the plunger 42 engages the recess 64 formed on the yoke shaft 62, thereby preventing the yoke shaft from being extracted from the receiver. With the pilot's display unit in its vertical or operational position, the end of the plunger bears directly against the first fiatted surface 66.

It will be appreciated that the pilot's display unit 12 interfaces with the strut assembly only by means of the yoke shaft 62. Accordingly, once the strut assembly is properly calibrated, the yoke shaft of any display unit installed onto the strut assembly will assume the identical orientation with respect to the airframe. It is therefore possible to calibrate the display unit prior to installing the unit in the aircraft, by calibrating the display unit with respect to its yoke shaft.

Such pre-alignment is accomplished by placing the display unit in a calibrated optical mounting jig (not shown). By sending a predetermined electrical test pattern to the CRT and adjusting the X and Y gain controls, X and Y centering controls, and focus control, the display unit can be aligned to within the desired degree of tolerance. In military weapons targeting applications, the required degree of accuracy can be as great as one milliradian (one meter per kilometer). Means of providing a predetermined electrical test pattern and adjusting the X and Y gain, X and Y centering, and focus controls are well known to those skilled in the art. The optical mounting jig is similar to the mounting apparatus 10 in that it firmly grips the yoke shaft 62 of the pilot's display unit 12. The display unit is thus calibrated with reference to its yoke shaft; and since the yoke shaft is held in a predetermined attitude with respect to the airframe by the properly calibrated strut assembly 24, the display unit will already be properly calibrated when it is mounted in the aircraft. An advantage of this arrangement is that it affords ease of replacing a defective PDU with another display unit without the necessity for calibrating the replacement unit in the aircraft.

With the pilot's display unit thus mounted, appropriate electrical connections are made between the display unit and the video drive unit. The head-up display is now ready for use.

To use the head-up display, with the display unit lowered to its operational position, the pilot looks forwardly through the combiner glass with one eye. The combiner glass, partially light reflective and partially light transmittive, permits light from outside the aircraft to pass through. In addition, images projected from the CRT are reflected off the combiner glass into the pilot's line of sight. In this manner, images provided by the head-up display are superimposed onto real world images to provide the pilot with symbology showing vital flight parameters.

With the pilot's display unit in its operational position, the optical module 18 is only about four inches in front of the pilot's face. By positioning the optical module 18 so close to the pilot, a wide field of vision can be provided from a combiner glass 20 of minimum size. However, because of the proximity of the display unit to the pilot's face, the necessity for removing the PDU to a stowage position when not in use will be apparent.

To move the pilot's display unit 12 from its operational position to its stowage position, the pilot reaches up and grasps the lower end of the pilot's display unit with his left hand and rotates it in a clockwise direction. As the yoke shaft 62 rotates within the receiver 50, the corner 68 between the flatted surfaces 66, 67 bears against the end 70 of the plunger 42 and effects a camming action, reciprocally displacing the plunger toward the left as seen in FIGS. 2 and 3. As the display unit is raised into its horizontal position, the corner 68 between the flatted surfaces 66, 67 passes over center with respect to the plunger, permitting the plunger to be biased back to the right and into contact with the second flatted surface 67. Additionally, the pin 90 on the back of the PDU housing assembly 14 engages the latch 88 on the face of the mount housing 26, locking the display unit 12 in its stowage position and preventing its accidental dislodgement from a sudden movement of the aircraft.

When the pilot desires to view through the display unit, he reaches up with his left hand and depresses the latch 88 to disengage the latch from the pin 90 on the mount housing 26. The pilot then pulls the display unit downwardly in a counterclockwise direction to its vertical operational position. As the yoke shaft 62 rotates within the receiver 50, the corner 68 cams the plunger 42 toward the left. As the corner 68 passes over center with respect to the plunger, the plunger is biased back to the right and into engagement with the first flatted surface 66 of the yoke shaft 62 to retain the display unit in its operational position.

If the aircraft is subjected to sudden deceleration while the display unit is in its operational position, such as would be the case if the aircraft were subjected to a survivable crash, the pilot's head would be thrown forward against the lower end of the PDU. If the force exerted against the FDU exceeds a predetermined maximum, 8 to 20 pounds in the disclosed embodiment, the crash-release latch 96 will be sprung, permitting the display unit 12 to pivot forwardly about its crash-release pivot pin 84. As the display unit rotates forwardly to its crash-release position, the crash lock pin 108 is spring-biased into engagement with the detent 110 formed on the PDU housing assembly 14. This locking action retains the display unit forward in its crash-release position, preventing the display unit 12 from rebounding rearwardly into the pilot's head and inflicting injury to the pilot. The pilot's display unit can be returned from its crash-release position by grasping the head of the crash-lock pin 108 between thumb and forefinger of the left hand and pulling it outwardly, while using the remaining three fingers to pull the PDU forwardly into its operating position. As the display unit 12 is pulled into its upright position, the flange 98 on the upper end of the PDU housing assembly 14 will engage the crash-release latch 96 to once again lock the display unit in its upright position.

If it is desired to remove the pilot's display unit from its mounting, such as would be necessitated by a component failure, removal is a quick and easy process. The electrical cables 17 connecting the CRT to the video drive unit are disconnected. A lever, such as the shaft of a screwdriver, is inserted between the fixed post 80 on the face of the mount housing 26 and the plunger pin 76 protruding through its slot 78. The lever is then used to pry the plunger 42 out of engagement with the recess 64 in the yoke shaft 62. With the plunger thus extracted, the yoke shaft can be withdrawn from the receiver 50, completing the removal procedure.

Installation of a new pilot's display unit can be accomplished just as quickly and easily by reversing the procedure. Again, using an appropriate lever, the plunger 42 is extracted from the receiver 50, the yoke shaft 62 is inserted into the receiver, and the plunger is released to be biased into engagement with the recess 64 on the yoke shaft. Connection of the electrical cables 17 completes the installation.

An important feature of the present invention is the mounting of the pilot's display unit for rotation about two separate axes of rotation. The present invention recognizes that the two purposes for which the PDU must be rotated are inconsistent with a single axis of rotation. As has previously been discussed, in many aircraft there is not sufficient space directly fore or aft of the display unit to rotate the display unit into a suitable stowage position. Rather, a suitable stowage position and ease of moving the unit to and from its stowage position are best provided by rotating the display unit laterally. On the other hand, since the display unit must break away forwardly in order to afford crash protection, safety dictates a lateral axis of rotation such that the display unit can pivot forward. Accordingly, by providing a display unit mounting apparatus which provides rotation about two different axes of rotation, the mounting apparatus of the present invention provides both convenient stowage and crash protection.

Another feature of the present invention is the provision of a means for restraining the display unit, once having broken away in a crash, in a forward position. The advantage of this feature is that the display unit, once forwardly broken away by an impact, will be retained in a forward position and prevented from rebounding rearwardly and striking the pilot in the head.

A further feature of the present invention is the connection of the pilot's display unit to the mount housing by means of a single shaft, and the retention of that shaft within the mount housing by means of a spring-biased plunger. The advantage of this feature is that it affords ease and speed of mounting and dismounting the pilot's display unit using a minimum of tools. Removing the PDU from its mount is as simple as levering the spring-biased plunger away from the yoke shaft and extracting the yoke shaft from the strut assembly. Installation is accomplished by merely reversing these steps. No easily-lost fasteners are involved, and only a single tool is required.

While the preferred embodiment has been disclosed with respect to a pilot's display unit intended for mounting on the right side of the aircraft, it will be appreciated that a similar mount may be employed to mount a display unit on the left-hand side or center line of the aircraft as well. For a left-hand installation, however, the yoke shaft would be angularly offset to the left of the normal axis of the yoke, rather than to the right as shown in the disclosed embodiment.

Finally, it will be understood that the preferred embodiment of the present invention has been disclosed by way of example, and that other modifications may occur to those skilled in the art without departing from the scope and spirit of the appended claims.

What is claimed is:

1. An apparatus for mounting the pilot's display unit of a head-up display system to suspend from the cockpit overhead of an aircraft, comprising:
   means mountable to the cockpit overhead for providing a fixed reference with respect to the aircraft;
   means for pivotably mounting said pilot's display unit to said fixed reference means for rotation about a first axis of rotation substantially parallel to the longitudinal axis of said aircraft, and
   means for pivotably mounting said pilot's display unit to said fixed reference means for rotation about a second axis of rotation substantially perpendicular to the longitudinal axis of said aircraft,
   whereby said pilot's display unit is rotatable about said first axis of rotation in a vertical plane perpendicular to said longitudinal axis of said aircraft, such that said display unit is laterally rotatable between a vertical position, in which the pilot's display unit is suspended in a pilot's line of sight, and a horizontal position, in which the display unit is rotatably raised out of the pilot's line of sight for stowage, and
   whereby said pilot's display unit is rotatable about said second axis of rotation in a vertical plane parallel to said longitudinal axis of said aircraft, such that said display unit is forwardly rotatable to a forward position removed from the pilot's head.

2. The apparatus of claim 1, further comprising means operable when said pilot's display unit is in a vertical operating position for normally retaining said pilot's display unit against rotation about said second axis of rotation and releasable in response to a predetermined force exerted against said pilot's display unit to permit rotation about said second axis of rotation.

3. The apparatus of claim 1, further comprising means engagable at a predetermined location upon forward rotation of said pilot's display unit about said second axis of rotation for retaining said pilot's display unit against rotation about said second axis of rotation.

4. The apparatus of claim 1, further comprising means operative when said pilot's display unit is in a vertical operating position for retaining said pilot's display unit against rotation about said first axis of rotation.

5. The apparatus of claim 1, further comprising means operative when said pilot's display unit is in a horizontal stowage position for retaining said pilot's display unit against rotation about said first axis of rotation.

6. An apparatus for mounting the pilot's display unit of a head-up display system to suspend from the cockpit overhead of an aircraft, comprising:
   a frame mountable to the cockpit overhead;
   a yoke pivotably mounted within a receiver in said frame for rotation about a first axis of rotation substantially parallel to the longitudinal axis of said aircraft, and
   means for pivotably mounting said pilot's display unit to said yoke for rotation about a second axis of rotation substantially perpendicular to the longitudinal axis of said aircraft,
   whereby said yoke is rotatable about said first axis of rotation in a vertical plane perpendicular to said longitudinal axis of said aircraft, such that said display unit mounted thereto is laterally rotatable between a vertical position, in which the pilot's display unit is suspended in a pilot's line of sight, and a horizontal position, in which the display unit is rotatably raised out of the pilot's line of sight for stowage, and
   whereby said pilot's display unit is rotatable about said second axis of rotation in a vertical plane normal to said longitudinal axis of said aircraft, such that said display unit is forwardly rotatable to a forward position removed from the pilot's head.

7. The apparatus of claim 6, further comprising latch means engagable when said pilot's display unit is in said vertical position to retain said pilot's display unit against rotation about said second axis of rotation and releasable in response to a predetermined force exerted against said pilot's display unit to permit rotation about said second axis of rotation.

8. The apparatus of claim 6, further comprising latch means engagable when said pilot's display unit is rotated to said forward position to retain said pilot's display unit against rotation about said second axis of rotation.

9. The apparatus of claim 6, further comprising means operative when said pilot's display unit is in said vertical position to retain said pilot's display unit against rotation about said second axis of rotation.

10. The apparatus of claim 9, wherein said yoke shaft has a flatted surface thereon, said flatted surface being vertically disposed within said frame when said pilot's display unit is in said vertical position, and wherein said frame further comprises a plunger mounted for reciprocal motion within said frame, said plunger being spring biased toward said yoke shaft such that the end of said plunger bears against said flatted surface of said yoke shaft to retain said pilot's display unit against rotation about said second axis of rotation.

11. The apparatus of claim 10, wherein said flatted surface comprises a first flatted surface, and wherein said yoke shaft further comprises a second flatted surface thereon, said second flatted surface being vertically disposed within said frame when said pilot's display unit is in said horizontal position, whereby said spring-biased plunger bears against said first flatted surface of said yoke shaft to retain said pilot's display unit in said vertical position and bears against said second flatted surface of said yoke shaft to retain said pilot's display unit in said horizontal position.

12. The apparatus of claim 11, wherein the engagement of said plunger with said flatted surfaces of said yoke shaft maintains said yoke shaft within said frame such that said yoke shaft cannot be extracted from said frame so long as said plunger engages said yoke shaft.

13. The apparatus of claim 6, further comprising means operative when said pilot's display unit is in a said horizontal position to retain said pilot's display unit against rotation about said second axis of rotation.

14. The apparatus of claim 13, wherein said yoke shaft has a flatted surface thereon, said flatted surface being vertically disposed within said frame when said pilot's display unit is in said horizontal position, and wherein said frame further comprises a plunger mounted for reciprocal motion within said frame, said plunger being spring biased toward said yoke shaft such that the end of said plunger bears against said flatted surface of said yoke to retain said pilot's display unit against rotation about said second axis of rotation.

* * * * *